United States Patent [19]

Shirley

[11] 4,432,291

[45] Feb. 21, 1984

[54] UNDERGROUND IRRIGATOR

[76] Inventor: Dewey D. Shirley, 2223 W. Rovey, Phoenix, Ariz. 85015

[21] Appl. No.: 344,476

[22] Filed: Feb. 1, 1982

[51] Int. Cl.³ .............................................. A01C 11/00
[52] U.S. Cl. ...................................... 111/7.1; 111/7.3
[58] Field of Search ................... 111/7.1, 7.2, 7.3, 7.4, 111/6; 47/1, 48.5; 422/278, 282, 63, 266; 239/310, 315, 316, 317, 318; 137/101.11, 205.5, 625.41

[56] References Cited

U.S. PATENT DOCUMENTS

| | | | |
|---|---|---|---|
| 1,997,097 | 4/1935 | Bartlett | 111/7.1 |
| 2,336,522 | 12/1943 | Aiman | 111/7.1 |
| 2,602,699 | 1/1952 | Otto et al. | 422/282 |
| 2,893,334 | 7/1959 | Snyder | 111/7.1 |
| 3,455,054 | 7/1969 | Tibbals, Jr. | 47/1 |

Primary Examiner—Robert A. Hafer
Assistant Examiner—Bradley M. Lewis
Attorney, Agent, or Firm—Herbert E. Haynes, Jr.

[57] ABSTRACT

Underground irrigation apparatus (10) having a ground penetrating part (12) arranged for being inserted into ground to be irrigated with the assistance of a handle part (14) connected to the ground penetrating part. A fluid control assembly (16) associated with the ground penetrating part (12) and the handle part (14) provides a fluid flow under pressure to facilitate insertion into ground to be irrigated of the ground penetrating part (12) and subsequently a redirected flow to irrigate ground in which the ground penetrating part is inserted. The fluid control assembly (16) includes a valve (44) connectible to a suitable source of fluid for alternately directing same in a desired direction. A removable mixer portion (70) directs fluid along the path which irrigated ground in which the ground penetrating part (12) is inserted in order to add a fertilizer, and the like, to the irrigating flow.

8 Claims, 4 Drawing Figures

U.S. Patent      Feb. 21, 1984      4,432,291
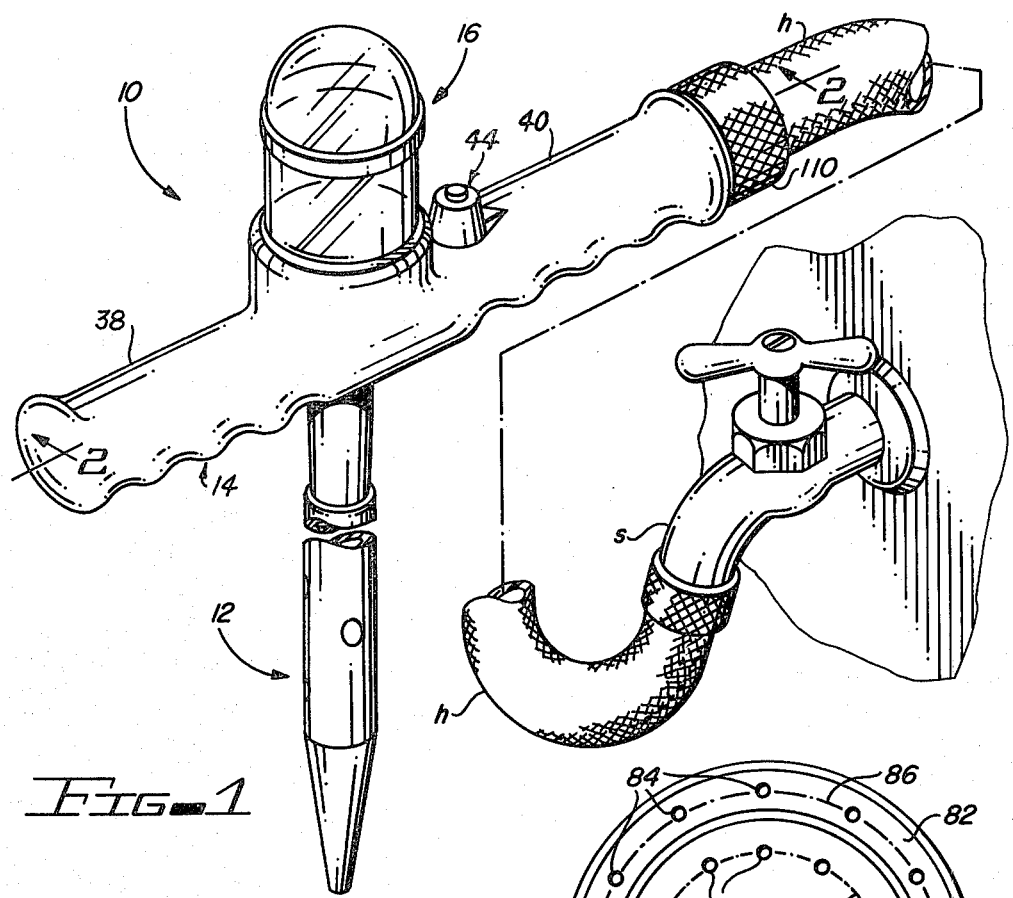
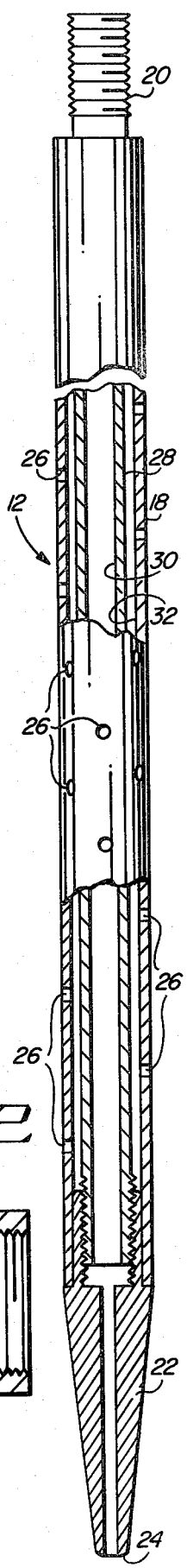
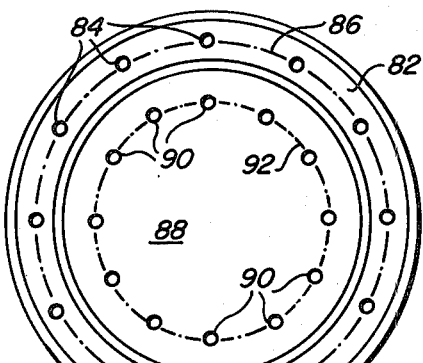
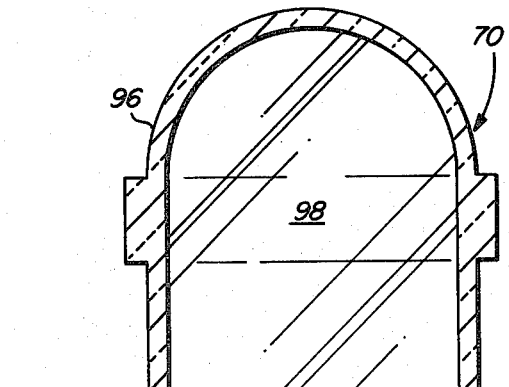
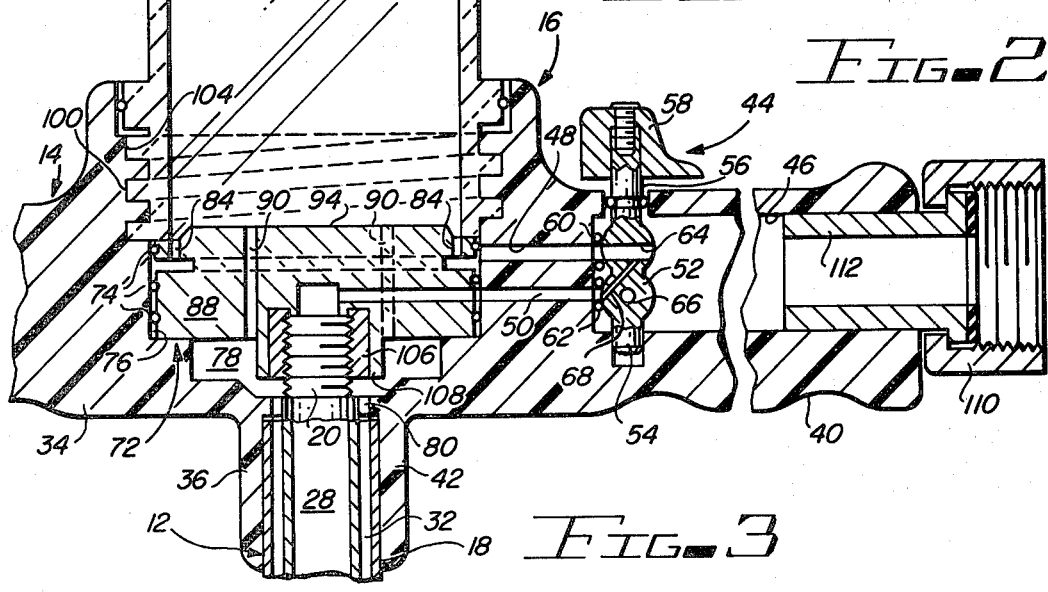

UNDERGROUND IRRIGATOR

BACKGROUND OF THE INVENTION

1. Field of the Invention

This invention relates generally to an apparatus capable of injecting water or other suitable fluid directly beneath the ground in order to water roots, and the like, and particularly to an underground irrigating apparatus capable of using the irrigating medium for assisting in inserting the apparatus in the ground to be irrigated.

2. Description of the Prior Art

It has long been known to treat soil used for various crops, by inserting appropriate device into the ground to be treated. For example, U.S. Pat. No. 3,762,171, issued Oct. 2, 1973, to I. Bjorheim, et al, discloses a ground heater which injects steam into the soil being treated in order to thaw same. More commonly, however, such apparatus is employed for purposes of direct irrigation of roots, and the like, for fertilizing crops, or for killing weeds.

For example, U.S. Pat. No. 749,758, issued Jan. 19, 1904, to W. G. Templeton, discloses an underground irrigator device including two pieces of pipe connected at right angles by a shutoff valve. One of the pipes is designed for connection to a hose and the other for insertion into soil to be irrigated. The latter pipe is provided with a water outlet at its lower end and ground cutting teeth for facilitating insertion in the soil to be treated, and may be equipped with a nozzle if desired. A stream of water or other medium emerges only from the lower, or nozzle end of the ground insertable pipe so as to aid in penetration of the pipe as well as irrigating the soil. Further, U.S. Pat. Nos. 1,893,707, issued Jan. 10, 1933, and 1,964,064, issued June 26, 1934, both to G. C. Karshner, disclose an apparatus for underground fertilization of tree roots, and the like, which are similar to the device discussed above in that a treating medium emerges only from a lower end of a longitudinally extending pipe, or tube, inserted into the soil to be treated. In U.S. Pat. No. 1,893,707, a hand-operated shutoff squeeze lever can be employed to control the flow of a liquid fertilizer into the soil being treated.

U.S. Pat. No. 2,850,992, issued Sept. 9, 1958, to J. J. Hooper, et al, discloses a garden watering tool which includes a plurality of prongs insertable into soil to be irrigated, but in which the irrigating medium flows out of a downwardly extending pointed tip of each of the prongs in the same manner as in the device as discussed above. U.S. Pat. No. 3,326,306, issued June 20, 1967, to B. B. Weir, discloses a water spade, which, although primarily intended as a space in which a fluid medium assists in digging, will inherently irrigate the soil in which the spade is being used. This device is similar to those discussed previously, however, in fact the flow of water or other fluid medium is only through the end of a pipe insertable into the ground being treated.

U.S. Pat. No. 1,058,138, issued Apr. 8, 1913, to A. C. Ballou, discloses a device primarily intended for preparing soil for transplanting purposes and in which an inner sleeve slidably disposed in an appertured outer sleeve causes a lateral flow of water when the device has been inserted into soil to be treated. A primary difference between this device and those discussed above is that the triggering flow is lateral of the ground insertable pipe member as opposed to axial flow. In a like manner, U.S. Pat. No. 3,900,962, issued Aug. 26, 1975, to S. F. Chan, discloses a fertilizing apparatus which is wind driven for metering air and collected rain directly into the soil to be treated. Like the device discussed immediately above, the flow of fluid from the portion of the device inserted into soil being treated is lateral as opposed to axial of the inserted portion.

U.S. Pat. No. 2,875,713, issued Mar. 3, 1959, to W. M. Schoffner, discloses a root feeder combining both lateral and axial discharge from a ground insertable portion. This combined flow, however, is constant in both directions, instead of the more desirable primarily axial flow drain during insertion and primarily exclusively lateral flow after insertion.

U.S. Pat. Nos. 2,336,522, issued Dec. 14, 1943, to J. K. Aiman, and 3,659,536, issued May 2, 1972, to R. B. White, overcome the principal drawback of the device discussed immediately above by controlling axial and lateral flow as desirable. To accomplish this end, the former device employs separate control valves disposed in a portion of the apparatus which remains above ground, while the latter device permits axial flow at all times but has a sliding sleeve valve disposed in the ground penetrating portion thereof for blocking and unblocking the lateral apertures. A principal disadvantage of this construction is that the sliding parts can become clogged by dirt during the ground penetrating operation.

SUMMARY OF THE INVENTION

It is an object of the present invention to provide underground irrigating apparatus which is capable of more precise control of penetrating and irrigating fluid flows than with known devices of this kind.

It is another object of the present invention to provide underground irrigating apparatus which is simple and reliable of construction, and which will resist clogging and the like during operation.

Another object of the present invention is to provide an underground irrigating apparatus which assures sufficient flow pressure of the irrigating medium to effectively penetrate the soil being irrigated.

It is yet another object of the present invention to provide an underground irrigator apparatus which permits mixing of a water soluble soil additive into the irrigating stream.

These and other objects are achieved in accordance with the present invention by providing an underground irrigator apparatus comprising a ground penetrating part capable of being inserted into the ground to be irrigated with assistance of a handle part connected to the ground penetrating part. A fluid control assembly associated with the ground penetrating and handle parts for providing a fluid flow under pressure to facilitate insertion into the ground to be irrigated of the ground penetrating part and subsequently a redirected flow laterally of the ground penetrating part to irrigate the soil in which the latter is inserted.

The fluid control assembly advantageously includes a removable mixer portion disposed along a fluid path intended for irrigating ground in which the ground penetrating part is inserted. The advantage of this construction is that a water soluble soil additive can be entrained or dissolved in the stream, while assuring sufficient pressure of the irrigating medium in order to penetrate the soil in which the apparatus is inserted.

The ground penetrating part preferably includes a longitudinally extending, hollow pipe having a pair of longitudinally spaced ends and terminating at a one of the ends in a fitting permitting removable attachment of the pipe to the handle part. At the other of the ends of the pipe preferably is a tapered nozzle providing a hollow, ground-insertion assisting tip. The pipe is provided with at least one orifice disposed adjacent the nozzle for diverting a fluid laterally of the pipe. A sleeve extending through the pipe from the fitting to the nozzle thereof is arranged separating the pipe into a central passage communicating with the nozzle and an outer annular passage communicating with the orifice.

The handle part of the apparatus preferably includes a generally T-shaped housing forming a crossbar and depending leg, with the crossbar being arranged for facilitating insertion into soil to be treated of the ground penetrating part. The leg portion of the housing forms a connector for fastening the leg to the fitting of the pipe of the ground penetrating part.

The fluid control assembly preferably includes a valve disposed in the crossbar of the handle part and connectable to a source of fluid for alternately directing fluid to the central passage and the annular passage by manipulation of a control knob of the valve by an operator of the apparatus. An advantageous feature of the present invention permits a portion of the flow directed to the annular passage to be bled to the central passage in order to direct some of the irrigating medium out of the nozzle of the ground insertable pipe as well as out of the orifice of same. Preferably, there are a plurality of orifices arranged for directing the triggering medium laterally of the ground-insertable pipe forming the ground penetrating part of the apparatus.

The foregoing and other objects of this invention as well as the invention itself, may be more fully understood when read in conjunction with the following drawings.

BRIEF DESCRIPTION OF THE DRAWINGS

FIG. 1 is a partly diagrammatic, fragmentary, perspective view showing underground irrigation apparatus according to the present invention.

FIG. 2 is an enlarged, side elevational view partly in longitudinal section, showing the ground penetrating part of the apparatus of FIG. 1.

FIG. 3 is an enlarged, fragmentary sectional view taken generally along the line 3—3 of FIG. 1.

FIG. 4 is a top plane view of a fluid flow directing plug used with the apparatus of FIGS. 1 through 3.

DESCRIPTION OF THE PREFERRED EMBODIMENTS

Referring more particularly to FIG. 1 of the drawings, an apparatus 10 according to the present invention for underground irrigating comprises a ground penetrating part 12 arranged for being inserted into ground (not shown) to be irrigated, and a handle part 14 connected to the ground penetrating part 12 for assisting in insertion of the latter. A fluid control assembly 16 associated with the ground penetrating part 12 and the handle part 14 provides a fluid flow under pressure to facilitate insertion into ground to be irrigated of part 12 and subsequently a redirected flow to irrigate ground in which the ground penetrating part 12 is inserted.

Ground penetrating part 12 includes a longitudinally extending, hollow pipe 18 having a pair of longitudinally spaced ends and terminating at a one of the ends in a fitting 20 provided with conventional screw threads and arranged for permitting removable attachment of pipe 18 to handle part 14. At the other of the ends is disposed a tapered nozzle 22 providing a hollow ground-insertion assisting tip 24. Pipe 18 also is provided with at least one orifice disposed adjacent nozzle 22 for directing a fluid flow laterally of pipe 18. Preferably, pipe 18 is provided with a plurality of orifices 26 as illustrated. A sleeve 28 extends through pipe 18 from fitting 20 to nozzle 22 and is arranged coaxially with pipe 18 for separating same into a central passage 30 communicating with nozzle 22 and an outer annular passage 32 communicating with the orifices 26. Sleeve 28 is anchored at its lower end by screw threaded engagement with a threaded bore provided in the upper end of nozzle 22, and at its upper end by action of handle part 14 in a manner to be described below.

As can be seen from FIGS. 3 and 4 of the drawings, handle part 14 includes a generally T-shaped housing forming a crossbar 34 and a depending leg 36. Crossbar 34 extends substantially equally in opposite directions from leg 36 and is provided in each section with a grip portion 38 and 40 arranged for facilitating insertion into ground of part 12. Leg 36 is provided with a screw threaded socket 42 for forming a connector which permits removable fastening of leg 36 to the fitting 20 of pipe 18 of part 12.

Fluid control assembly 16 includes a valve 44 disposed in crossbar 34 of handle part 14 and connectible to a source of fluid such as water, for alternately directly fluid to the central passage 30 and the annular passage 32. Partially forming valve 44 is a void 46 provided in one section of crossbar 34 of handle part 14 for receiving a fluid from a suitable source. Also included in valve 44 is a pair of passageways 48 and 50 each in communication with void 46 and with a respective one of central passage 30 and annular passage 32 of pipe 18. A valve spool or element 52 is rotatably mounted in void 46 of crossbar 34 adjacent the passageways 48 and 50, as by the illustrated shaft 54 extending from element 52 to the outside of crossbar 34 as through an opening 56. A suitable knob 58 is affixed to shaft 54 for permitting manual rotation of same to position valve element 52 as desired. Each of the passageways 48 and 50 advantageously is provided with a conventional O-ring seal 60 and 62, and the like, for assuring a proper seal between valve element 52 and passageways 48, 50. Valve element 52 has provided therein a pair of ports 64 and 66 disposed at approximately 90° with respect to one another and selectively alignable with passageways 48 and 50, respectively, so that only one of the passageways 48, 50 will be unblocked for a given position of valve element 52. As seen in FIG. 3, port 64 and passageway 48 are unblocked, while port 66 is at right angles to its associated passageway 50 for blocking flow betwee the two.

Valve 44 further includes valve element 52 being provided with a bypass 68 arranged extending from part 64, being associated with passageway 48 and the annular passage 32 of pipe 18 to a location in alignment with passageway 50, associated with central passage 30 of pipe 18, for bleeding a predetermined amount of fluid to the central passage 30 when port 64 is in alignment with passageway 48, as illustrated in FIG. 3.

The fluid control assembly 16 further includes a mixer portion 70 disposed between passageway 48 and annular passage 32 of pipe 18 for permitting mixing of a water soluble soil additive as well as increasing the head of the fluid flow to orifice 26. A disc-shaped element 72 is arrangeable in the crossbar 34 of handle part 14 directly above leg 36 in watertight relation as by the use of the illustrated three O-ring seals 74. A bottom peripheral portion of element 72 rest on a shoulder formed in the bottom of a generally cylindrical recess 76 formed in crossbar 34, with a small area beneath recess 76 being hollow to form a sump 78 whose purpose will become clear below. Leading from the bottom of sump 78 are a plurality of guide slots 80 which permit passage of fluid from element 72 into annular passageway 32 of pipe 18.

Element 72 includes a first manifold 82 which extends directly from passageway 48 and has extending laterally thereof upwardly away from leg 36 a plurality of apertures 84 arranged on a circle 86. A second manifold 88 included in element 72 is provided with a plurality of holes 90 extending completely through element 72 between parallel, planar faces thereof and arranged on a circle 92 concentric with but of a smaller diameter than circle 86. Holes 90 preferably are provided in a boss 94 provided on the upwardly facing planar face of element 72 in order to further separate the ring of holes 90 from the ring of apertures 84.

A dome 96 forms a chamber 98 arranged for containing a water soluble soil additive (not shown), such as a conventional granulated fertilizer, and is disposed above manifold 82 for receiving a flow of fluid from same. Manifold 88 is arranged between chamber 98 and pipe 18 for receiving fluid from chamber 98 and feeding same to annular passage 32 of pipe 18. Threads 100 are provided on the lower portion of dome 96 for threadingly engaging with matching threads 102 provided on the inner wall of a socket formed in the upper middle portion of crossbar 34 as by annular flange 104.

As will be appreciated, the water passing into chamber 98 from manifold 82 will pass upwardly to the top of dome 96 and then downwardly to holes 90 of manifold 88. In this manner, not only will the pressure head on the fluid passing through holes 90 be increased, but any fluent material disposed in chamber 98 will be entrained or absorbed in the flow. Dome 96 can be removed from crossbar 34 for refilling merely by unthreading same from flange 104 in order to permit cleaning of element 72.

A hollow bushing 106 provided with internal screw threads matching those provided on fitting 20 of pipe 18 can be press fit, and the like, into a socket 108 provided in the lower face of element 72. Thus, pipe 18 is essentially hung to element 72 by the sleeve 28 extending to the center of pipe 18, with the upper end of pipe 18 itself abutting a shoulder provided at the top of the socket 42 provided in leg 36. Suitable O-ring seals, and the like, can be provided both in socket 42 and at the upper portion of flange 104 as illustrated in order to assure fluid tightness of the unit.

The mouth of the void 46 formed in one arm or section of crossbar 34 is advantageously blocked by a conventional hose fitting 110 having a hollow plug portion 112 fittingly engaged within void 46. By this arrangement, a hose h (FIG. 1) can be coupled to fitting 110 in a conventional manner, not shown, in order to permit a flow of water, and the like, from a spigot s to be fed into void 46 and supply a working medium for apparatus 10.

As can be understood from the above description and from the drawings, underground irrigation apparatus according to the present invention permits irrigation in an efficient and reliable, yet simple manner. Not only is apparatus according to this invention useful for watering of roots, and the like, but is particularly useful in areas having high temperatures coupled with low humidity, in as much as conventional surface watering in such areas is highly inefficient and wasteful of natural resources due to rapid evaporation of the water or other working fluid.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. Apparatus for underground irrigation comprising, in combination:
    (a) ground penetrating means for being inserted into ground to be irrigated;
    (b) handle means connected to the ground penetrating means for assisting in forcing the latter into ground to be irrigated; and
    (c) fluid means associated with the ground penetrating means and the handle means for providing a fluid flow under pressure to facilitate insertion into ground to be irrigated of the ground penetrating means and subsequently a redirected flow to irrigate ground in which the ground penetrating means is inserted, the ground penetrating means including a nozzle providing a hollow, ground-insertion assisting tip, and orifice means disposed on the ground penetrating means adjacent the nozzle for diverting a fluid laterally of the ground penetrating means, the latter forming a central passage communicating with the nozzle and an outer annular passage communicating with the orifice means, the fluid means including valve means connectible to a source of fluid for alternately directing fluid to the central passage and the annular passage, the valve means including the handle means being provided with a fluid receiving void and a pair of passageways each in communication with the void and a respective one of the central passage and the annular passage of said ground penetrating means, a valve element rotatably mounted in the void of the handle means adjacent the passageways thereof and provided with a pair of ports disposed at approximately 90° with respect to one another and selectively alignable with an associated one of the passageways; a bypass means for bleeding a predetermined amount of the fluid to the control passage of said ground penetrating means when said valve means connected to direct the fluid to the annular passage of said ground penetrating means.

2. Apparatus as defined in claim 1, wherein the valve means further includes the valve element being provided with said bypass means arranged extending from a one of the ports associated with the annular passage of the ground penetrating means to a location in alignment with a one of the passageways associated with the central passage of the ground penetrating means for bleeding a predetermined amount of fluid to the central passage when the one of the ports associated with the annular passage is in alignment with the other of the passageways.

3. Apparatus as defined in claim 2, wherein the ground penetrating means includes a longitudinally extending, hollow pipe having a pair of longitudinally spaced ends and terminating at a one of the ends in a fitting permitting removable attachment of the pipe to the handle means, and at the other of the ends in the tapered nozzle, the pipe being provided with the orifice means and with a sleeve extending through the pipe from the fitting to the nozzle and arranged separating the pipe into the central passage and the annular passage.

4. Apparatus as defined in claim 3, wherein the handle means includes a generally T-shaped housing forming a crossbar and depending leg, the crossbar being arranged for facilitating insertion into ground of the ground penetrating means, and the leg forming connector means for fastening the leg to the fitting of the pipe of the ground penetrating means.

5. Apparatus for underground irrigation comprising, in combination:
   (a) ground penetrating means for being inserted into ground to be irrigated;
   (b) handle means connected to the ground penetrating means for assisting in forcing the latter into ground to be irrigated; and
   (c) fluid means associated with the ground penetrating means and the handle means for providing a fluid flow under pressure to facilitate insertion into ground to be irrigated of the ground penetrating means and subsequently a redirected flow to irrigate ground in which the ground penetrating means is inserted, the ground penetrating means including a longitudinally extending, hollow pipe having a pair of longitudinally spaced ends and terminating at a one of the ends in a fitting permitting removable attachment of the pipe to the handle means, and at the other of the ends in a tapered nozzle providing a hollow, ground-insertion assisting tip, the pipe being provided with an orifice means disposed adjacent the nozzle for diverting a fluid laterally of the pipe, and a sleeve extending through the pipe from the fitting to the nozzle and arranged separating the pipe into a central passage communicating with the nozzle and an outer annular passage communicating with the orifice means, the handle means including a generally T-shaped housing forming a crossbar and depending leg, the crossbar being arranged for facilitating insertion into ground of the ground penetrating means, and the leg forming connector means for fastening the leg to the fitting of the pipe of the ground penetrating means, the fluid means including valve means disposed in the crossbar of the handle means and connectible to a source of fluid for alternately directing fluid to the central passage and the annular passage, the valve means including the crossbar of the handle means being provided with a fluid receiving void and a pair of passageways each in communication with the void and a respective one of the central passage and the annular passage of the pipe, and a valve element rotatably mounted in the void of the crossbar adjacent the passageways thereof and provided with a pair of ports disposed at approximately 90° with respect to one another and selectively alignable with an associated one of the passageways, the valve means further including the valve element being provided with a bypass arranged extending from a one of the ports associated with the annular passage of the pipe to a location in alignment with a one of the passageways associated with the central passage of the pipe for bleeding a predetermined amount of fluid to the central passage when the one of the ports associated with the annular passage is in alignment with the other of the passageways.

6. Apparatus as defined in claim 5, wherein the fluid means includes diffuser means for directing a fluid along a path to irrigate ground in which the ground penetrating means is inserted.

7. Apparatus as defined in claim 5, wherein the fluid means further includes mixer means disposed between the other of the passageways and the annular passage of the pipe for permitting addition of an additive and for increasing the head of the fluid flow, the mixer means comprising a first manifold means for receiving fluid from the other of the passageways, chamber means removable disposed above the first manifold means for containing a quantity of an additive and for receiving a flow of fluid to mix with the additive, and second manifold means arranged between the chamber means and the pipe for receiving a fluid and additive mixture from the chamber means and feeding same to the annular passage of the pipe.

8. Apparatus as defined in claim 7, wherein the first manifold means and the second manifold means are formed in a disc-shaped element arrangable in the crossbar of the handle means above the leg thereof, with the first manifold means including a plurality of apertures arranged in a circle about the element, and the second manifold means including a plurality of holes arranged on a circle concentric with but of a smaller diameter than the circle of the apertures of the first manifold means.

* * * * *